(12) United States Patent
Takamura et al.

(10) Patent No.: US 9,724,855 B2
(45) Date of Patent: Aug. 8, 2017

(54) ROLL MOLDING DEVICE

(71) Applicants: NISHIMURA CO., LTD., Aichi (JP); Tomoyuki Takamura, Aichi (JP); Keiji Hashimoto, Aichi (JP)

(72) Inventors: Tomoyuki Takamura, Kariya (JP); Keiji Hashimoto, Kariya (JP); Tomio Kinoshita, Toyota (JP); Manabu Kinoshita, Toyota (JP)

(73) Assignee: Toyota Shatai Kabushiki Kaisha, Aichi-ken (JP)

( * ) Notice: Subject to any disclaimer, the term of this patent is extended or adjusted under 35 U.S.C. 154(b) by 309 days.

(21) Appl. No.: 14/403,875

(22) PCT Filed: Jun. 26, 2013

(86) PCT No.: PCT/JP2013/067482
§ 371 (c)(1),
(2) Date: Nov. 25, 2014

(87) PCT Pub. No.: WO2014/007117
PCT Pub. Date: Jan. 9, 2014

(65) Prior Publication Data
US 2015/0190951 A1    Jul. 9, 2015

(30) Foreign Application Priority Data
Jul. 3, 2012   (JP) .................................. 2012-149580

(51) Int. Cl.
*B29C 43/46* (2006.01)
*B21D 13/04* (2006.01)
(Continued)

(52) U.S. Cl.
CPC ................ *B29C 43/46* (2013.01); *B21B 1/22* (2013.01); *B21B 27/02* (2013.01); *B21D 13/04* (2013.01);
(Continued)

(58) Field of Classification Search
CPC ........ B21D 13/04; B21D 13/08; B21D 28/12; B21D 31/043; B21D 31/046; B21D 47/00;
(Continued)

(56) References Cited

U.S. PATENT DOCUMENTS

| | | | | |
|---|---|---|---|---|
| 735,635 A | * | 8/1903 | White ................. | B21D 31/043 29/6.2 |
| 1,864,598 A | * | 6/1932 | Kessler ................ | B21D 31/046 29/6.1 |

(Continued)

FOREIGN PATENT DOCUMENTS

| | | | | |
|---|---|---|---|---|
| GB | 340333 A | * | 1/1931 | ........... B21D 31/046 |
| JP | 57114314 A | * | 7/1982 | |

(Continued)

OTHER PUBLICATIONS

Extended European Search Report for Application No. 13812725.3, mailed Mar. 9, 2016 (7 pgs.).
English translation of International Preliminary Report on Patentability for PCT/JP2013/067482, 4 pages.

*Primary Examiner* — Teresa M Ekiert
*Assistant Examiner* — Gregory Swiatocha
(74) *Attorney, Agent, or Firm* — Patterson Thuente Pedersen, P.A.

(57) ABSTRACT

In the present invention, when synchronization is lost due to backlash, and deviation between the rotational phases of a first processing roll and a second processing roll occurs, deviation between the rotational phases of dummy rotating bodies also occurs, and dummy blade parts of the dummy rotating bodies interfere with each other before blade parts of cutting blades of the first processing roll and the second processing roll (40) interfere with each other. Thus, interference between the blade parts is prevented.

4 Claims, 3 Drawing Sheets

(51) Int. Cl.
  *B21D 13/08* (2006.01)
  *B21D 28/12* (2006.01)
  *B21B 1/22* (2006.01)
  *B21B 27/02* (2006.01)
  *B29D 16/00* (2006.01)

(52) U.S. Cl.
  CPC ............. *B21D 13/08* (2013.01); *B21D 28/12* (2013.01); *B29D 16/00* (2013.01); *B29C 2043/464* (2013.01)

(58) Field of Classification Search
  CPC .. B21D 47/02; B21D 55/00; B29C 2043/064; Y10T 83/0333; Y10T 83/037; Y10T 83/0378; Y10T 83/141; Y10T 83/148; Y10T 83/175; Y10T 83/4702; Y10T 83/768; Y10T 83/7809; Y10T 83/783; Y10T 83/6584; Y10T 83/6587; Y10T 83/6588; B44B 35/0009; B44B 35/0047
  USPC ...... 72/203, 204, 185, 186, 252.5; 429/1, 40
  See application file for complete search history.

(56) References Cited

U.S. PATENT DOCUMENTS

| | | | |
|---|---|---|---|
| 5,136,765 | A | 8/1992 | Tanaka et al. |
| 5,239,735 | A | 8/1993 | Tanaka et al. |
| 6,725,751 | B1 | 4/2004 | Surina |
| 2005/0199110 | A1* | 9/2005 | Marlow ................. B21D 28/36 83/13 |
| 2013/0207308 | A1* | 8/2013 | Fricker ................... B29C 55/18 264/280 |
| 2013/0273322 | A1* | 10/2013 | Boegli ...................... B31F 1/07 428/156 |

FOREIGN PATENT DOCUMENTS

| | | | |
|---|---|---|---|
| JP | 2568285 | B2 | 12/1996 |
| JP | 10-211650 | A | 8/1998 |
| JP | 10-223232 | A | 8/1998 |
| JP | 2003-211225 | A | 7/2003 |
| KR | 20080008036 | * | 4/2008 |
| WO | WO 01/34320 | A1 | 5/2001 |

* cited by examiner

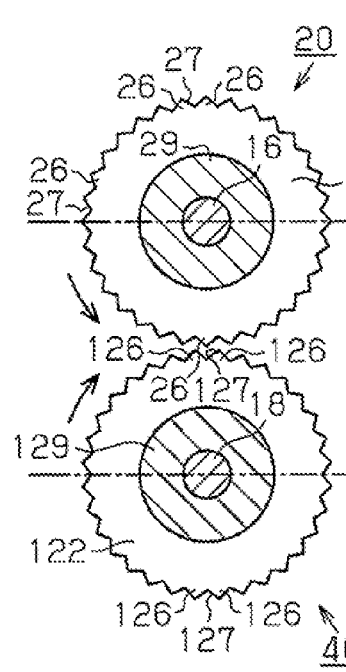
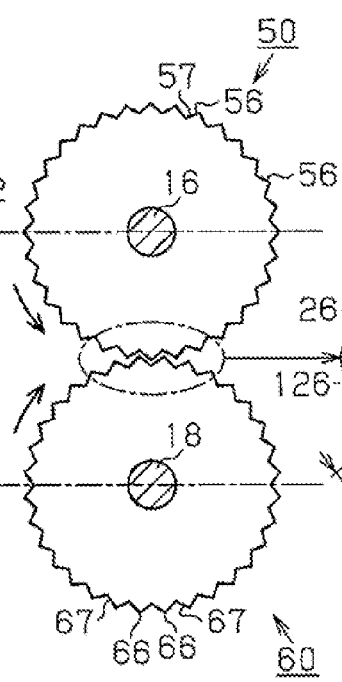
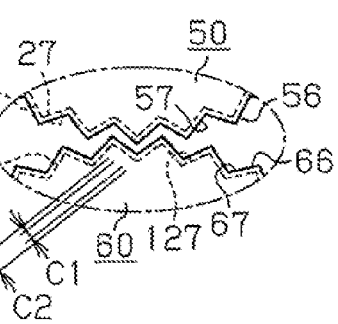
Fig.3(a) Fig.3(b) Fig.3(c)
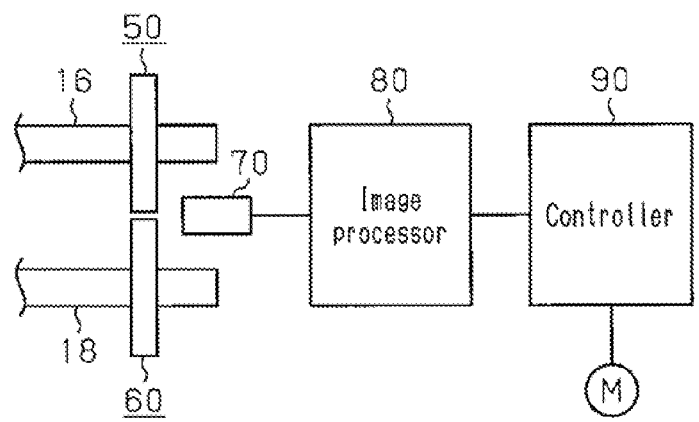
Fig.4

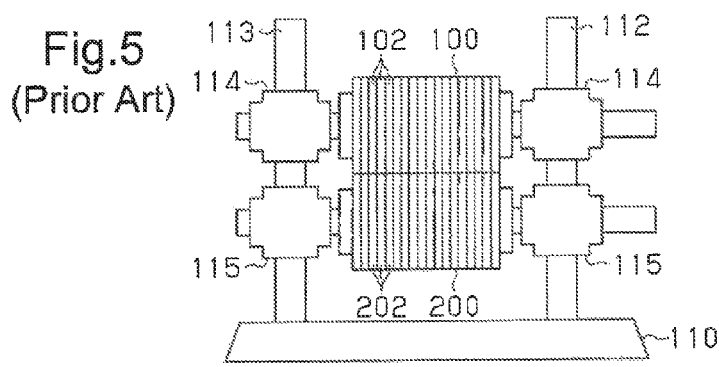
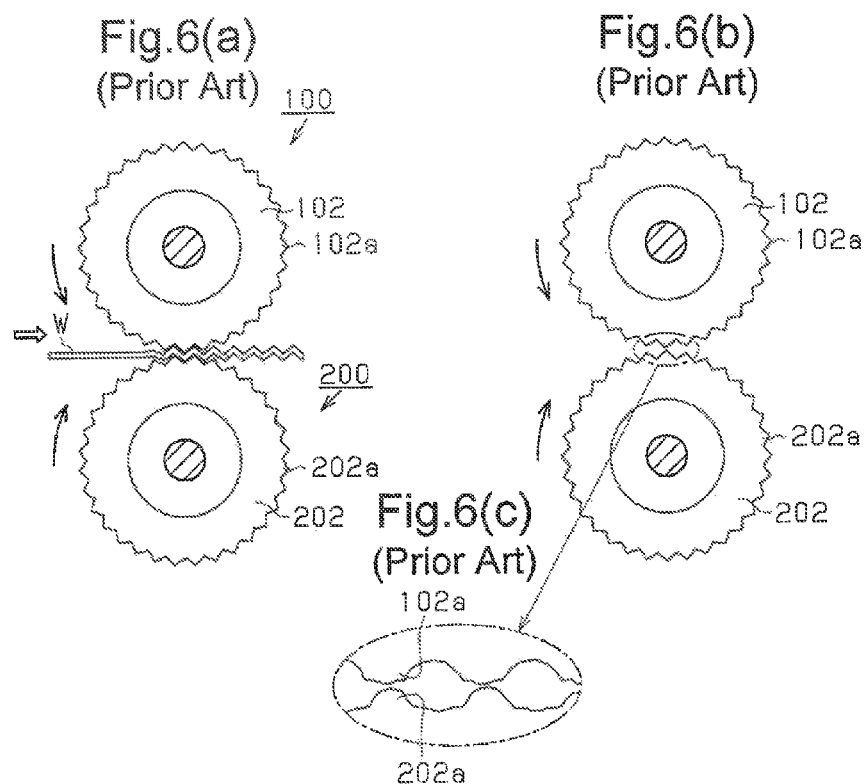

ROLL MOLDING DEVICE

RELATED APPLICATIONS

The present application is a National Phase entry of PCT Application No. PCT/JP2012/077072, filed Oct. 19, 2012, which application claims priority to Japanese Application No. 2012-041838, filed Feb. 28, 2012, both of said applications being hereby incorporated by reference in their entirety.

BACKGROUND OF INVENTION

The present invention relates to a roll forming machine.

The apparatus disclosed in Patent Document 1 is an example of a known roll forming machine. The roll forming machine disclosed in Patent Document 1 includes, as shown in FIG. 5, an upper roll 100 and a lower roll 200, which are rotationally supported on a pair of side walls 112, 113 provided on a base 110 via a pair of bearings 114 and a pair of bearings 115. The upper roll 100 and the lower roll 200 are formed by laminating disk-like cutters 102, 202 at predetermined intervals. As shown in FIGS. 6(a) and 6(b), cutting parts 102a, 202a project from the peripheral portion of the disk-like cutters 102, 202 at a predetermined pitch. The cutting parts 102a, 202a of the rolls 100, 200 mesh with each other. The meshing forms slits in a metal sheet W sandwiched between the rolls 100, 200.

Although a method for synchronously rotating the upper roll 100 and the lower roll 200 is not specifically disclosed in Patent Document 1, torque is typically transmitted between the upper roll 100 and the lower roll 200 via a non-illustrated gear mechanism.

Patent Document 2 discloses a plastic sheet forming roll apparatus, which includes a base embossing roll driven by a precision control electric motor and a driven embossing roll. A plastic sheet is sandwiched between the base embossing roll and the driven embossing roll so that the plastic sheet is embossed. In the apparatus of Patent Document 2, the rotational angle of each of the base embossing roll and the driven embossing roll is measured with a pulse generator, and the precision control electric motor is controlled such that the rotational angles match with each other.

PRIOR ART DOCUMENTS

Patent Documents

Patent Document 1: Japanese Patent No. 2568285
Patent Document 2: Japanese Laid-Open Patent Publication No. 10-211650

SUMMARY OF THE INVENTION

In Patent Document 1, if the gears of the gear mechanism go out of synchronization due to, for example, backlash of the gears, the cutting parts 102a, 202a of the rolls may interfere with each other as shown in FIG. 6(c), and the cutting parts may possibly be damaged.

The rolls of Patent Document 1 may be synchronously rotated using the electric motor of Patent Document 2. As described above, in Patent Document 2, the rolls are controlled to synchronously rotate using, for example, the pulse generator such that the rotational angle of the base embossing roll matches with the rotational angle of the driven embossing roll. However, synchronous control may possibly fail due to disturbance such as electrical noise. In this case, rotational phase deviation may possibly occur. Thus, the possibility that the cutting parts of the rolls interfere with each other is not eliminated even if the control technology disclosed in Patent Document 2 is applied to the apparatus of Patent Document 1.

Accordingly, it is an objective of the present invention to provide a roll forming machine that prevents interference between cutting parts of a pair of processing rolls, and prevents damage on the cutting parts even if rotational phase deviation occurs between the processing rolls.

To achieve the foregoing objective and in accordance with one aspect of the present invention, a roll forming machine is provided that includes a pair of processing rolls arranged to face each other. The pair of processing rolls each includes cutting parts formed on an outer circumferential portion such that the cutting parts mesh with each other to machine a sheet inserted between the processing rolls. The roll forming machine includes interference preventing means that has a pair of dummy rotating bodies arranged on rotary shafts of the pair of processing rolls. Each dummy rotating body includes dummy cutting parts the number of which is equal to the number of the cutting parts of each processing roll. When rotational phase deviation occurs between the processing rolls, the interference preventing means prevents interference between the cutting parts of the processing rolls based on rotational phase deviation that simultaneously occurs between the dummy rotating bodies.

In this case, when rotational phase deviation occurs between the pair of processing rolls, the cutting parts of the processing rolls are prevented from interfering each other, thus preventing damage on the cutting parts.

The interference preventing means preferably sets a first clearance between the dummy cutting parts of the dummy rotating bodies to be smaller than a second clearance between the cutting parts of the processing rolls. When rotational phase deviation occurs, the interference preventing means preferably causes interference to occur between the dummy cutting parts of the dummy rotating bodies.

In this case, since the dummy cutting parts of the dummy rotating bodies interfere with each other, the cutting parts of the pair of processing rolls are prevented from interfering with each other, thus preventing damage on the cutting parts.

The thickness of the dummy cutting parts is preferably set greater than the thickness of the cutting parts. In this case, damage on the dummy cutting parts when the dummy cutting parts interfere with each other is less than the case in which the thickness is set smaller.

The dummy cutting parts are preferably set harder than the cutting parts. In this case, damage on the dummy cutting parts when the dummy cutting parts interfere with each other is reduced as compared to a case in which the dummy cutting parts are not set hard.

The interference preventing means includes a clearance detecting unit, which detects a first clearance between the dummy cutting parts of the dummy rotating bodies, and a controller, which stops a drive source that drives the rotary shafts when the first clearance detected by the clearance detecting unit becomes less than a threshold value.

In this case, when the first clearance detected by the clearance detecting unit becomes less than the threshold value, it is determined that rotational phase deviation has occurred between the processing rolls, and the controller stops the driving source of the rotary shafts. This prevents the cutting parts of the processing rolls from interfering with each other, thus preventing damage on the cutting parts.

According to the present invention, when rotational phase deviation occurs between a pair of processing rolls, cutting parts of the processing rolls are prevented from interfering with each other, thus preventing damage on the cutting parts.

BRIEF DESCRIPTION OF THE DRAWINGS

FIG. 3(a) is a cross-sectional side view illustrating a first processing roll and a second processing roll;

FIG. 3(b) is a cross-sectional side view illustrating dummy rotating bodies;

FIG. 3(c) is a partially enlarged view of FIG. 3(b);

FIG. 4 is a control block diagram of a roll forming machine according to another embodiment;

FIG. 5 is a schematic view illustrating a conventional roll forming machine;

FIG. 6(a) is a cross-sectional side view illustrating the upper roll and the lower roll of the conventional roll forming machine;

FIG. 6(b) is an explanatory diagram illustrating a state in which the cutting parts of the conventional upper and lower rolls interfering with each other; and FIG. 6(c) is a partially enlarged view of FIG. 6(b).

DETAILED DESCRIPTION OF THE PREFERRED EMBODIMENTS

First Embodiment

A roll forming machine according to a first embodiment of the present invention will now be described with reference to FIGS. 1 to 3.

Figure 1:
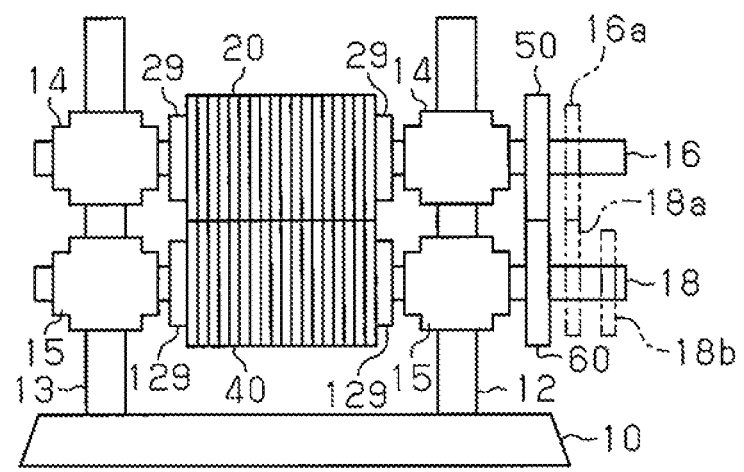
FIG. 1 is a schematic view illustrating a roll forming machine according to one embodiment.

As shown in FIG. 1, the roll forming machine includes a base 10, a pair of side walls 12, 13, which extends from the base 10, a first rotary shaft 16, a second rotary shaft 18, a first processing roll 20, which is secured to the first rotary shaft 16, and a second processing roll 40, which is secured to the second rotary shaft 18 to face the first processing roll 20. The first rotary shaft 16 is rotationally supported on the side walls 12, 13 by a pair of bearings 14. The second rotary shaft 18 is rotationally supported on the side walls 12, 13 by a pair of bearings 15. The first rotary shaft 16 and the second rotary shaft 18 are arranged parallel with each other.

Gears 16a, 18a, which mesh with each other, are secured to the right ends of the first rotary shaft 16 and the second rotary shaft 18. A sprocket 18b is further secured to the right end of the second rotary shaft 18. The sprocket 18b is rotated by a non-illustrated electric motor via a non-illustrated endless chain looped over the sprocket 18b. When the sprocket 18b is rotated, the gears 16a, 18a rotate the first rotary shaft 16 in synchronization with the second rotary shaft 18 at the same speed.

Since the first processing roll 20 and the second processing roll 40 have the same structure, only the structure and peripheral members of the first processing roll 20 will be described. The corresponding structure and peripheral members of the second processing roll 40 will be given reference numbers obtained by adding 100 to the reference numbers of the structure and peripheral members of the first processing roll 20, and detailed explanation is omitted.

As shown in FIGS. 1 and 3(a), the first processing roll 20 includes a predetermined number of ring-like cutting blades 22 and a metal cylindrical retainer 29. The cutting blades 22 are fitted and secured to the outer circumference of the retainer 29 in a laminated state. The retainer 29 is secured to the first rotary shaft 16 by a known method (for example, key coupling). The cutting blades 22 are formed of hard metal such as stainless-steel.

Protruding cutting parts 26 are formed at a predetermined pitch on the outer circumferential portion of the cutting blades 22 as shown in FIG. 3(a). Additionally, a recess 27 is formed between adjacent cutting parts 26. Although not shown, any two cutting blades 22 that are adjacent to each other in the axial direction of the first rotary shaft 16 are arranged such that the cutting parts 26 are displaced by half the predetermined pitch.

As shown in FIG. 3(a), the cutting parts 26 of the cutting blades 22 of the first processing roll 20 are arranged to enter recesses 127 of cutting blades 122 of the second processing roll 40 when pressing or roll-forming a workpiece made of a metal plate.

Figure 2:
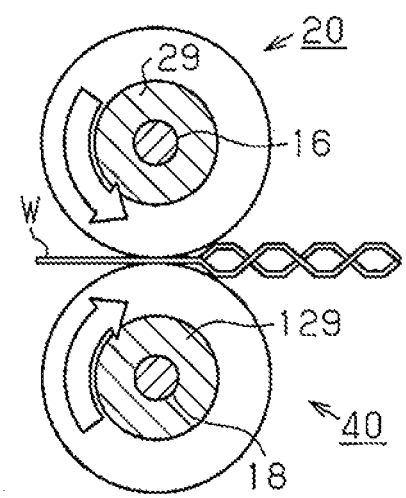
FIG. 2 is an explanatory diagram illustrating a state in which a plate is being processed by the roll forming machine.

In the present embodiment, when a workpiece is fed between the first processing roll 20 and the second processing roll 40 of the roll forming machine and pressed, projections and recesses are continuously formed in a row as shown in FIG. 2 on a metal sheet W by the cutting parts 26 of the cutting blades 22 of the first processing roll 20 and the recesses 127 of the cutting blades 122 of the second processing roll 40, and by cutting parts 126 of the cutting blades 122 of the second processing roll 40 and the recesses 27 of the cutting blades 22 of the first processing roll 20 shown in FIG. 3(a).

In FIG. 2, for the purposes of illustration, the contours of the first processing roll 20 and the second processing roll 40 are substituted by the largest diameter portions of the rotation loci of the cutting parts 26, 126.

As shown in FIG. 1, a pair of dummy rotating bodies 50, 60 is secured to parts of the first rotary shaft 16 and the second rotary shaft 18 located between the gears 16a, 18a and the bearings 14, 15 by a known coupling method such as keys.

As shown in FIG. 3(b), the outer circumferential portions of the dummy rotating bodies 50, 60 are similar to the cutting blades 22, 122 of the first processing roll 20 and the second processing roll 40. That is, in the partially enlarged view of FIG. 3(c), the solid line defines dummy cutting parts 56, 66 and dummy recesses 57, 67 of the dummy rotating bodies 50, 60, and the broken line defines the cutting parts 26, 126 and the recesses 27, 127 of the cutting blades 22, 122. The dummy recesses 57, 67 are the region including the proximal end of the dummy cutting parts 56, 66. The number of the dummy cutting parts 56, 66 of the dummy rotating bodies 50, 60 is equal to the number of the cutting parts 26, 126. The thickness of the dummy cutting parts 56, 66 is set greater than the thickness of the cutting parts 26, 126 of the first processing roll 20 and the second processing roll 40. Since the thickness of the dummy cutting parts 56, 66 is set greater than the thickness of the cutting parts 26, 126 of the first processing roll 20 and the second processing roll 40, if the dummy cutting parts 56, 66 interfere with each other, damage on the dummy cutting parts 56, 66 is reduced as compared to the case in which the thickness is set smaller.

As shown in FIG. 3(c), the clearance between the distal end of each dummy cutting part 56 and the proximal end of the corresponding dummy cutting part 66 (the dummy recess 67) is equal to the clearance between the distal end of each dummy cutting part 66 and the proximal end of the corresponding dummy cutting part 56 (the dummy recess 57). The clearances are indicated by C1, and are referred to as a first clearance C1. The clearance between the distal end of each cutting part 26 and the proximal end of the corresponding cutting part 126 (the recess 127) is equal to the clearance between the distal end of each cutting part 126 and the proximal end of the corresponding cutting part 26 (the recess 27). The clearances are indicated by C2, and are referred to as a second clearance C2. The first clearance C1 is set smaller than the second clearance C2.

The second clearance C2 is a gap between the distal end of each cutting part 26 and the proximal end of the corresponding cutting part 126 (the recess 127), which mesh with each other, or a gap between the distal end of each cutting part 126 and the proximal end of the corresponding cutting part 26 (the recess 27), which mesh with each other, while pressing the metal plate (workpiece) in a state where there is no rotational phase deviation between the rolls. Furthermore, the first clearance C1 is a gap between the distal end of each dummy cutting part 56 and the proximal end of the corresponding dummy cutting part 66 (the dummy recess 67), or a gap between the distal end of each dummy cutting part 66 and the proximal end of the corresponding dummy cutting part 56 (the dummy recess 57) when the distal end of each cutting part 26 and the proximal end of the corresponding cutting part 126 (the recess 127) mesh with each other with the second clearance C2 in between.

In a case in which the dummy rotating bodies 50, 60 are not provided, when rotational phase deviation occurs between the rolls due to backlash of the gears, the clearance between the rolls is eliminated, causing each cutting part 26 to interfere with the corresponding cutting part 126.

In contrast, according to the present embodiment, the first clearance C1 is set smaller than the second clearance C2. If rotational phase deviation occurs between the first processing roll 20 and the second processing roll 40, the dummy cutting parts 56, 66 of the dummy rotating bodies 50, 60 interfere with each other before the cutting parts 26, 126 of the first processing roll 20 and the second processing roll 40 interfere with each other, thus preventing the interference of the cutting parts 26, 126.

The dimension of the second clearance C2 may be any value as long as it is less than or equal to the thickness of the metal sheet W. If the second clearance C2 is less than the thickness of the metal sheet W, slits are formed by the meshing of the cutting parts 26, 126 as shown in FIG. 2 while the metal sheet W is pressed and extended by the first processing roll 20 and the second processing roll 40. If the second clearance C2 is equal to the thickness of the metal sheet W, the cutting parts 26, 126 form slits as shown in FIG. 2 in accordance with the meshing of the cutting parts 26, 126.

Operation of Embodiment

Operation of the roll forming machine configured as described above will now be described.

In a state in which the first processing roll 20 and the second processing roll 40 are rotated in the direction of arrows shown in FIG. 2 in accordance with and in synchronization with rotation of the gears 16a, 18a, when the metal sheet W is fed between the first processing roll 20 and the second processing roll 40, slits are formed in the metal sheet W by the meshing of the cutting parts 26, 126 as shown in FIG. 2. In this state, if the first processing roll 20 and the second processing roll 40 go out of synchronization due to backlash of the gears 16a, 18a, and rotational phase deviation occurs between the first processing roll 20 and the second processing roll 40, the dummy cutting parts 56, 66 of the dummy rotating bodies 50, 60, which have caused rotational phase deviation in the same manner, interfere with each other before the cutting parts 26, 126 of the cutting blades 22, 122 of the first processing roll 20 and the second processing roll 40 interfere with each other, and interference of the cutting parts 26, 126 is prevented. Thus, even if the gears 16a, 18a go out of synchronization, the cutting parts 26, 126 do not interfere with each other, and damage on the cutting parts 26, 126 is prevented.

The present embodiment has the following features.

(1) In the roll forming machine of the present embodiment, the first processing roll 20 and the second processing roll 40 (the pair of processing rolls) are arranged to face each other. As the cutting parts 26, 126 provided on the outer circumferential portion of the rolls mesh with each other, a sheet inserted between the rolls is processed. The pair of dummy rotating bodies 50, 60 is arranged on the first rotary shaft 16 and the second rotary shaft 18 of the first processing roll 20 and the second processing roll 40. The dummy rotating bodies 50, 60 include the dummy cutting parts 56, 66, the number of which is equal to the number of the cutting parts of the rolls. The present embodiment includes interference preventing means, which prevents interference between the cutting parts of the processing rolls by rotational phase deviation of the dummy rotating bodies 50, 60 that occurs simultaneously when rotational phase deviation occurs between the first processing roll 20 and the second processing roll 40.

According to the interference preventing means, the second clearance C2 between the cutting parts of the first processing roll 20 and the second processing roll 40 is set greater than the first clearance C1 between the dummy cutting parts 56, 66 of the dummy rotating bodies 50, 60 so that when rotational phase deviation occurs between the rolls, the dummy cutting parts 56, 66 of the dummy rotating bodies 50, 60 interfere with each other. Consequently, according to the present embodiment, when rotational phase deviation occurs between the processing rolls, the cutting parts of the processing rolls are prevented from interfering with each other, and the cutting parts are prevented from being damaged.

(2) According to the roll forming machine of the present embodiment, the thickness of the dummy cutting parts 56, 66 is set greater than the thickness of the cutting parts 26, 126. Thus, damage on the dummy cutting parts when the dummy cutting parts interfere with each other is smaller than the case in which the thickness is set smaller.

Second Embodiment

A second embodiment will now be described with reference to FIG. 4. The second embodiment partially differs from the first embodiment in the electrical configuration, and the hardware structure of the roll forming machine is identical to that of the first embodiment. The components of the roll forming machine of the second embodiment are thus provided with the same reference numerals as the corresponding components of the first embodiment, and detailed explanations are omitted.

As shown in FIG. 4, the second embodiment includes, to detect the first clearance C1 between each dummy cutting part 56 of the dummy rotating body 50 and the corresponding dummy cutting part 66 of the dummy rotating body 60, an imager 70, which takes images between the dummy cutting parts 56 and the dummy cutting parts 66 at a high speed, an image processor 80, which performs image processing including binarization of each image frame shot by the imager 70 to detect the first clearance C1, and a controller 90, which controls driving and stopping of an electric motor M, which rotates the sprocket 18b in the roll forming machine. In FIG. 4, for the purposes of illustration, the gears 16a, 18a and the sprocket 18b shown in FIG. 1 are omitted.

The imager 70 includes, for example, a CCD camera or a CMOS camera. A high-speed shutter of the imager 70 is capable of taking images of the dummy cutting parts 56 and the dummy cutting parts 66, which are rotating. The image processor 80 outputs a signal indicating that the first clearance C1 calculated for each image frame has become less than a previously determined threshold value, or that interference may occur. Upon receipt of the signal, the controller 90 stops the electric motor M. In the present embodiment, the imager 70 and the image processor 80 configure a clearance detecting unit. The electric motor M is one example of a driving source.

The present embodiment has the following features.

(1) The roll forming machine of the present embodiment includes, as the interference preventing means, the imager 70, which detects the first clearance C1 between the dummy cutting parts 56, 66 of the pair of dummy rotating bodies 50, 60, the image processor 80 (clearance detecting unit), and the controller 90, which stops the electric motor M (driving source) for driving the second rotary shaft 18 when the first clearance C1 detected by the imager 70 and the image processor 80 becomes less than the threshold value. As a result, according to the present embodiment, when the first clearance C1 becomes less than the threshold value, it is determined that rotational phase deviation has occurred between the first processing roll 20 and the second processing roll 40, and the controller 90 stops the electric motor M (driving source), which drives the second rotary shaft 18. This prevents the cutting parts of the first processing roll 20 and the second processing roll 40 from interfering with each other, thus preventing the cutting parts from being damaged.

The embodiments of the present invention are not limited to the above illustrated embodiments, but may be modified as follows.

In the above illustrated embodiments, the dummy rotating bodies 50, 60 are mounted on the first rotary shaft 16 and the second rotary shaft 18 between the gears 16a, 18a and the bearings 14, 15. However, the positions on the first rotary shaft 16 and the second rotary shaft 18 where the dummy rotating bodies 50, 60 are mounted are not limited. For example, the dummy rotating bodies 50, 60 may be provided at positions rightward of the gears 16a, 18a on the first rotary shaft 16 and the second rotary shaft 18 shown in FIG. 1. Alternatively, the left ends of the first rotary shaft 16 and the second rotary shaft 18 shown in FIG. 1 may extend further leftward of the bearings 14, 15, and the dummy rotating bodies 50, 60 may be provided on the extended portions.

Alternatively, the dummy rotating bodies 50, 60 may be provided on the first rotary shaft 16 and the second rotary shaft 18 between the first and second processing rolls 20, 40 and the bearings 14, 15.

In the above illustrated embodiments, the hardness of the dummy cutting parts 56, 66 of the dummy rotating bodies 50, 60 is not specified. However, the dummy cutting parts 56, 66 may be harder than the cutting parts 26, 126. If the dummy cutting parts 56, 66 are harder than the cutting parts 26, 126 of the first processing roll 20 and the second processing roll 40, damage on the dummy cutting parts 56, 66 is reduced in a case in which the dummy cutting parts 56, 66 interfere with each other.

In the above illustrated embodiments, the case of synchronization via the gear mechanism is explained. However, the above illustrated invention may be applied to a roll forming machine that employs the technology of synchronous control explained in the conventional device.

The roll forming machine of the above embodiment machines the metal sheet W. However, the material of the sheet is not limited to metal, but may be plastic or paper.

The driving source is not limited to an electric motor, but may be anything that rotates the rotary shaft. For example, linear motion of a linear driving source (for example, a linear motor) can be converted to rotary motion using a rotation converting mechanism to rotate the rotary shaft. The linear driving source may therefore be employed as the driving source.

DESCRIPTION OF THE REFERENCE NUMERALS

C1, C2 . . . first and second clearances, M . . . electric motor (driving source), 20 . . . first processing roll, 22 . . . cutting blade, 26, 126 . . . cutting parts, 40 . . . second processing roll, 50, 60 . . . dummy rotating bodies, 56, 66 dummy cutting parts, 90 . . . controller, 122 . . . cutting blade, 126 . . . cutting parts.

The invention claimed is:

1. A roll forming machine comprising:
a pair of processing rolls arranged to face each other, the pair of processing rolls each including cutting parts formed on an outer circumferential portion such that the cutting parts mesh with each other to machine a sheet inserted between the processing rolls; and
interference preventing mechanism including a pair of dummy rotating bodies arranged on rotary shafts of the pair of processing rolls, each dummy rotating body including dummy cutting parts the number of which is equal to the number of the cutting parts of each processing roll, wherein, in response to rotational phase deviation between the processing rolls, the interference preventing mechanism is configured to prevent interference between the cutting parts of the processing rolls based on rotational phase deviation that simultaneously occurs between the dummy rotating bodies,
wherein the interference preventing mechanism is configured to set a first clearance between the dummy cutting parts of the dummy rotating bodies to be smaller than a second clearance between the cutting parts of the processing rolls, and in response to the rotational phase deviation, the interference preventing mechanism is configured to cause interference to occur between the dummy cutting parts of the dummy rotating bodies.

2. The roll forming machine according to claim 1, wherein the dummy cutting parts have a thickness that is set greater than a thickness of the cutting parts.

3. The roll forming machine according to claim 1, wherein the dummy cutting parts are set harder than the cutting parts.

4. The roll forming machine according to claim 1, wherein,
the interference preventing mechanism includes:
a clearance detecting unit, which detects a first clearance between the dummy cutting parts of the dummy rotating bodies; and
a controller, which stops a drive source that drives the rotary shafts when the first clearance detected by the clearance detecting unit becomes less than a threshold value.

* * * * *